R. W. ROGERS.
Device for Manufacturing Bridge Links.
No. 235,455.   Patented Dec. 14, 1880.
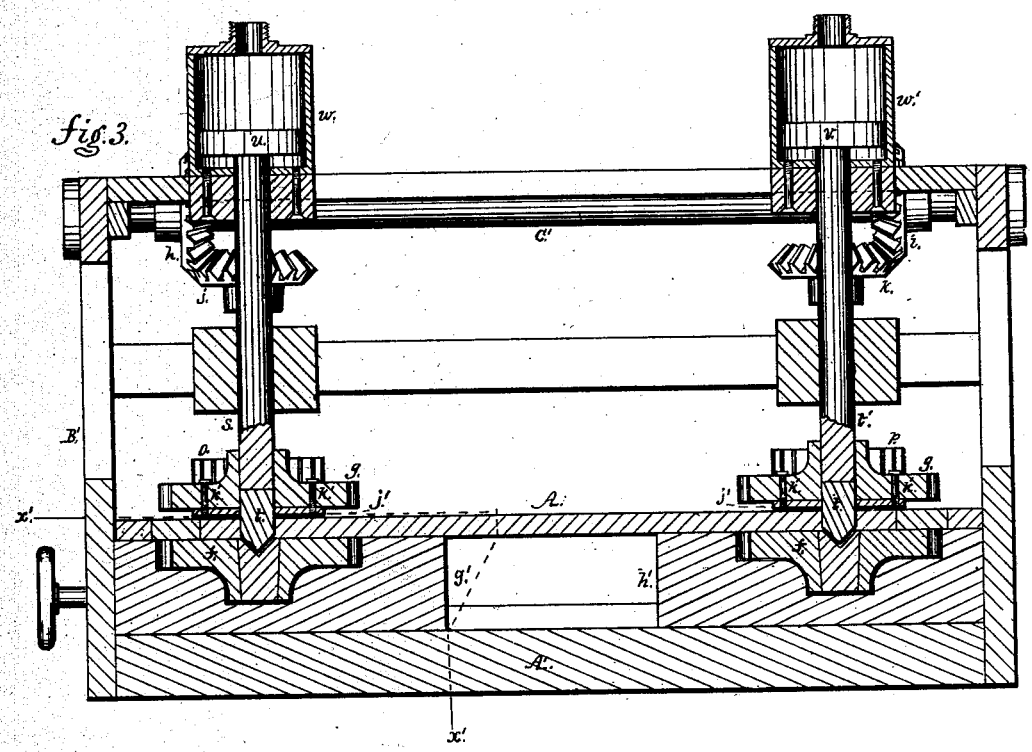
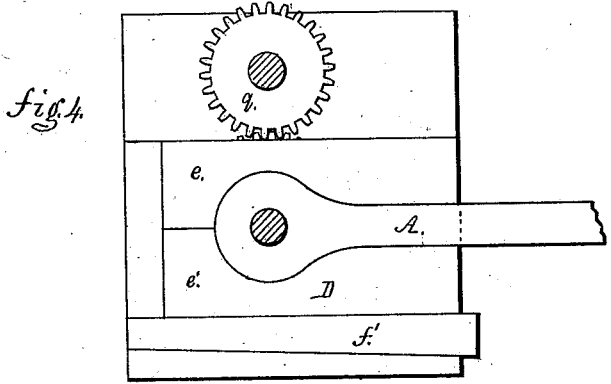
Witnesses
James J. Johnston.
D. C. Allen
Inventor
Rob't W. Rogers

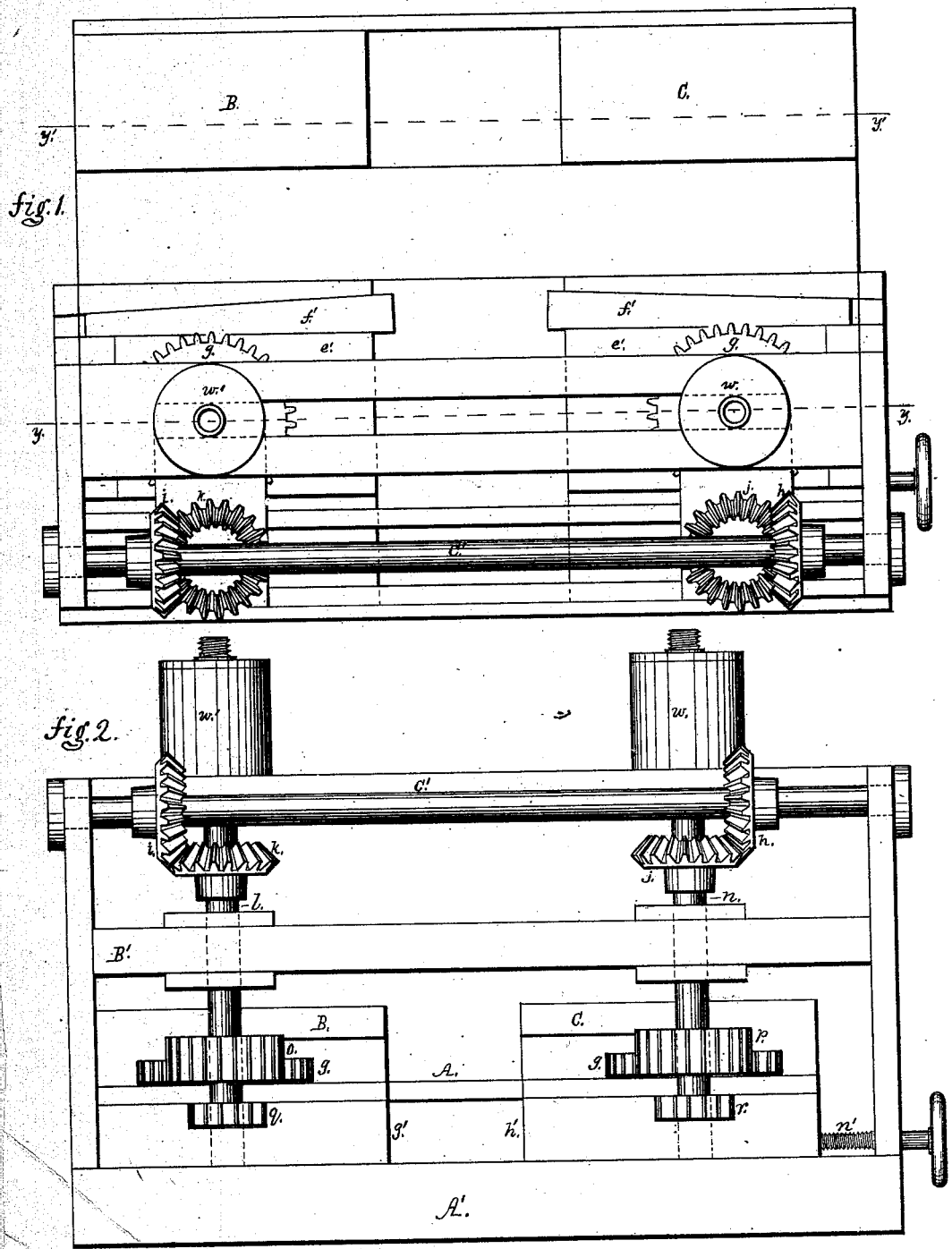
R. W. ROGERS.
Device for Manufacturing Bridge Links.
No. 235,455. Patented Dec. 14, 1880.

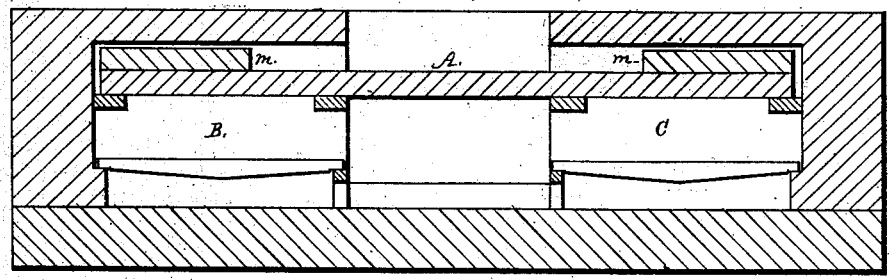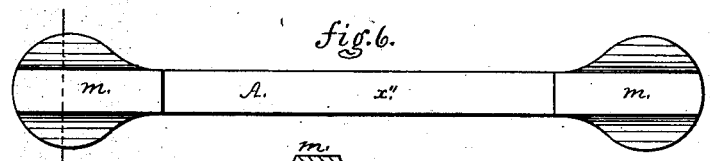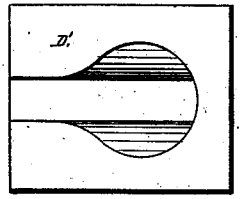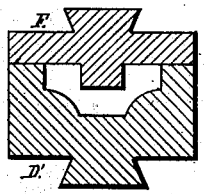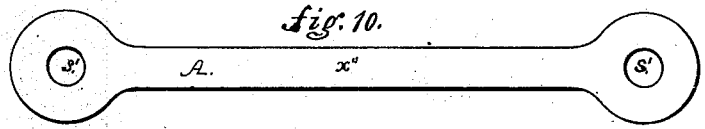

UNITED STATES PATENT OFFICE.

ROBERT W. ROGERS, OF PITTSBURG, PENNSYLVANIA.

DEVICE FOR MANUFACTURING BRIDGE-LINKS.

SPECIFICATION forming part of Letters Patent No. 235,455, dated December 14, 1880.

Application filed August 25, 1879.

*To all whom it may concern:*

Be it known that I, ROBERT W. ROGERS, of Pittsburg, in the county of Allegheny and State of Pennsylvania, have invented a certain new and useful Improvement in Machines for Making Bridge-Links; and I do hereby declare that the following is a full, clear, and exact description thereof, reference being had to the accompanying drawings, and to the letters of reference marked thereon.

The nature of my invention consists in the means hereinafter described for forming the two heads or ends of a bridge-link at one heat and one operation—viz., by forming in dies pieces corresponding to the contour of the link head or end and placing one of them on each end of a bar of iron or steel of the desired length and diameter, and then heating the two ends of said bar and the said pieces placed thereon to a welding-heat and subsequently subjecting the said heated ends of said bar to the action of a pair of dies having a revolving bottom and top.

To enable others skilled in the art with which my invention is most nearly connected to make and use it, I will proceed to describe its construction and operation.

In the accompanying drawings, which form part of my specification, Figure 1 is a top view of my improvement in machines for making bridge-links. Fig. 2 is a side elevation of the same. Fig. 3 is a vertical section of the machine at line $y$ of Fig. 1. Fig. 4 is a detail section at line $x'$ of Fig. 3. Fig. 5 is a vertical section of the furnaces at line $y'$ of Fig. 1. Fig. 6 is a top view of a bar of iron with the partially-formed ends placed thereon, prior to being welded thereto and forged to the form and size desired. Fig. 7 is a transverse section of the same at line $x$ of Fig. 6. Fig. 8 is a top view or plan of the bottom die, D', in which the pieces forming the ends of the links are swaged. Fig. 9 is a transverse section of the male and female parts D' F of the die, in which the partially-formed end pieces are swaged.

In the construction of a bridge-link a bar of iron or steel, A, of the length and diameter of the link at $x''$, is taken, and two pieces, $m$, of the form indicated in Figs. 6 and 7, are formed in a die such as is shown in Figs. 8 and 9. These two pieces $m$ are placed on the bar A, as shown in Fig. 6. The bar A, thus furnished with the partially-formed end pieces $m$, is placed in the furnaces B C, as shown in Fig. 5. These furnaces are filled with coke or other suitable fuel, which is fired and provided with an air-blast.

When the ends of the bar A and the pieces $m$ thereon are heated to a welding-heat the bar is removed and placed in the dies D of the welding and forging machine, and by the action of the revolving bottom $f$ and top $g$ of the dies in said machine the pieces $m$ are welded to the bar A and forged into the form shown in the finished link represented in Fig. 10.

The welding and forging machine consists of the base A' and frame B' for supporting the mechanism for the revolving bottoms $f$ and tops $g$ of the welding and forging dies D.

On the shaft $c'$ are two bevel-wheels, $h$ and $i$, which gear into bevel-wheels $j$ and $k$ on the vertical shafts $l$ and $n$, on which are spur-wheels $o\ p\ q\ r$, the two latter gearing into the teeth on the periphery of the bottom $f$, and the two former gearing into the teeth on the periphery of the tops $g$, of the welding and forging dies D.

The tops $g$ are secured on vertical shafts $s\ t'$, on the upper ends of which are piston-heads $u$ $v$, which move in cylinders $w\ w'$, which piston-heads may be operated by either water or steam, the application of which will be readily understood by the skillful mechanic without further description as to mode of applying said water or steam as a motor for operating the said piston-head.

The welding and forging dies D are constructed in four parts, to wit—bottom $f$, top $g$, and sides $e$ and $e'$—the parts $e$ of which are stationary and the parts $e'$ being removable and held in position by wedges $f'$. The revolving bottoms $f$ of the welding and forging dies are placed in a recess in the parts $g'$ and $h'$ of the base A' of the machine, and are provided with removable centers $t$. The under side of the tops $g$ of the welding and forging dies are furnished with detachable face-plates $j'$, held in position by means of screws, (indicated at $k'$ in Fig. 3,) and said tops $g$ are also provided with detachable center pieces, $t$, for forming the openings $s'$ in the ends of the links, as shown in Fig. 10.

I wish it clearly understood that I do not confine myself to moving the tops $g$ of the welding and forging dies downward, for both the bottom and top of said dies may be made to move toward each other, or either of said dies may be made to move vertically while the other revolves in or on a fixed bearing.

The furnace C is made so that it can be moved toward and from the furnace B, for the purpose of adapting them to the heating of links of different lengths; and the welding and forging dies D, and the mechanism connected therewith opposite to the furnace C are so arranged that they can be moved by an adjusting-screw, $n'$, so that links of varying lengths can be made.

As the construction and arrangement of the several parts of my improvement in machines for making bridge-links, and the relation that said parts bear to each other, will be readily understood from the foregoing description and by reference to the accompanying drawings, I will therefore proceed to describe the operation.

The bar A and its pieces $m$ being heated in the furnaces B C to a welding-heat, the parts $e'$ $e'$ of the welding-dies D D are removed, and tops $g$ $g$, being raised up by the upward movement of the piston-heads $u$ $r$, the heated bar A is placed in the dies D D and the parts $e'$ $e'$ placed in position and secured by the wedges $f'$ $f'$. Power is applied to the shaft C so as to revolve it, which will give motion to the mechanism which revolves the bottoms $f$ $f$ and tops $g$ $g$ of the welding and forging dies D D, and the tops $g$ $g$, moving downward by the force of the water or steam acting on the piston-heads $u$ $v$, will cause the centers $t$ $t$ to enter the heated ends of the bar A and spread out the metal in the dies D D, and the downward and revolving movement of the tops $g$ $g$ will cause the end pieces $m$ $m$ to be welded perfectly to the bar A, forging them into the form shown in Fig. 10, with openings $s'$ formed therein, the revolving in the same direction of the bottoms $f$ $f$ and tops $g$ $g$ giving to the faces a smooth finish, and causing the fiber or particles of metal to form in circular lines around the openings $s'$ of the link.

By means of the hereinbefore-described method and means, bridge-links can be formed at one heat and one operation with great facility and at diminished cost.

I claim—

1. As an improved device for manufacturing bridge-links, two similar furnaces adjustable toward and from one another for heating simultaneously the two ends of the bar, jointly with a machine having two sets of devices adjustable toward and from one another, and arranged contiguous to the furnaces for simultaneously welding, swaging, and punching the two ends of the bar, as set forth.

2. The combination, with the frame A or its equivalent, of the two sets of dies and punches arranged in relation to each other adjustably and otherwise, as described, and mechanism to rotate the top and bottom members or either of said dies, and to simultaneously impart to the same and to the punches pressure sufficiently great to weld, form, and punch the ends of the bar, as set forth.

3. The improved die D, comprehending blocks $e$ $e'$, wedge $f$, top and bottom plates, $f'$ and $g$, and interchangeable plates $j$, in combination with the center pin, $t$, and with mechanism to impart simultaneously welding-pressure and rotation to said top and bottom plates, as set forth.

ROBT. W. ROGERS.

Witnesses:
 FRED. F. TURNER,
 GEO. F. TURNER.